(12) United States Patent
Stewart

(10) Patent No.: US 6,885,854 B2
(45) Date of Patent: Apr. 26, 2005

(54) TERMINAL DIVERSITY FOR OFF-BOARD RAILWAY COMMUNICATIONS

(75) Inventor: Scot Stewart, Indialantic, FL (US)

(73) Assignee: GE Transportation Systems Global Signaling LLC, Melbourne, FL (US)

( * ) Notice: Subject to any disclaimer, the term of this patent is extended or adjusted under 35 U.S.C. 154(b) by 684 days.

(21) Appl. No.: 09/848,024

(22) Filed: May 3, 2001

(65) Prior Publication Data
US 2002/0164964 A1 Nov. 7, 2002

(51) Int. Cl.$^7$ .................................................. H04B 1/06
(52) U.S. Cl. .............................. 455/277.1; 455/278.1; 455/101; 455/277.2
(58) Field of Search .......................... 455/277.1, 278.1, 455/101, 277.2, 133, 272, 208, 209, 260, 257, 13.2, 13.3; 375/347

(56) References Cited

U.S. PATENT DOCUMENTS

| | | | |
|---|---|---|---|
| 5,420,883 A | | 5/1995 | Swensen et al. |
| 5,548,835 A | * | 8/1996 | Sasaki ..................... 455/277.1 |
| 5,867,801 A | * | 2/1999 | Denny ......................... 701/35 |
| 5,913,177 A | * | 6/1999 | Meredith et al. ........... 455/272 |
| 5,953,659 A | * | 9/1999 | Kotzin et al. ............. 455/277.1 |
| 6,091,372 A | * | 7/2000 | Dienes ........................ 343/770 |
| 6,807,401 B2 | * | 10/2004 | Boyle .......................... 455/101 |
| 2003/0092402 A1 | * | 5/2003 | Shapira et al. .............. 455/101 |

* cited by examiner

Primary Examiner—Edward F. Urban
Assistant Examiner—Lana Le
(74) Attorney, Agent, or Firm—Carl Rowold; Polster, Lieder, Woodruff & Lucchesi, L.C.

(57) ABSTRACT

An off-board communications system (50) for railway communications to and from a locomotive (10) and a central station (18). A radio (56) utilizes multiple antennas (52, 54) to broadcast a transmission signal (62, 64) over parallel communications paths so to insure that a data sent from a locomotive (10) is complete. In one embodiment, the antennas (52, 54) are selected to broadcast signals as a function of signal magnitude and phase weighting so to optimize transmissions directed at a remotely located receiver (42). In another embodiment, antennas (92, 94) broadcast at different frequencies, and with different modulation and broadcast protocols. A signal divider (74) such as a multiplexer divides the signal prior to transmission, and a signal recombining unit (84) recombines transmitted signals (80, 82) at the receiving site. A performance/availability checker is employed to monitor transmission integrity.

14 Claims, 3 Drawing Sheets

TERMINAL DIVERSITY FOR OFF-BOARD RAILWAY COMMUNICATIONS

CROSS-REFERENCE TO RELATED APPLICATIONS

None.

STATEMENT REGARDING FEDERALLY SPONSORED RESEARCH AND DEVELOPMENT

Not Applicable.

BACKGROUND OF THE INVENTION

This invention relates to railway communications systems, and, in particular, to "off-board" communications between a railbound vehicle and a central station or control center of a railroad.

As used herein, a railbound vehicle means any railroad asset or vehicle which may require or benefit from the transmission or reception of data, including a locomotive, a maintenance-of-way (MOW) vehicle, or other vehicle. For convenience, this invention will be discussed principally in terms of a locomotive.

As used herein, "off-board" communications refer to communications between a locomotive, railcar, or other railroad "asset" which is in service (i.e., traveling over a line of road of a rail system), and a control center. The communications are typically two-way wireless communications in which a radio, for example, transmits signals to, and/or receives signals from the control center. The communications need to be timely and reliably sent and received, transmitted in a cost-effective manner, and have a high information "throughput". Throughput refers to the amount of information (data) transmitted during a defined time interval; for example, bits per second or bps. Since the control center is usually some distance away from the train, off-board communications are sent via satellite, a cellular communications system, or other radio based infrastructure.

Since the communication are two way communications, this means data is both sent from and to the track asset. Information communicated from the locomotive to the control center will sometimes include "health and status" data relating to such things as train speed, operating temperature of the locomotive's engine(s), fuel consumption, etc.; as well as the physical location of the train on the rail line. This latter is important because locomotives often get "misplaced", especially when loaned to another rail carrier for use on the other carrier's track. Accordingly, information giving the precise location of a train or locomotive aids the railway in controlling its operations and its assets. At other times, the information will relate to "work orders" which describe activities for crews to accomplish by specific times or at specific locations.

Information communicated to the locomotive from a control center(s) could include safety information, such as track warrants or other locomotive proximity data; or, it could be other general purpose data, such as track database information. Safety information (sometimes referred to as "vital" information) needs to be communicated precisely and with a very low chance of data error.

It is important to note that off-board communications are expected to increase dramatically in the near future. Locomotives, maintenance-of-way vehicles, and railcars have an increasing number of microprocessors and sensors installed throughout. Railroads are now recognizing the advantage of better managing their information to improve their tactical and strategic operations. For the purposes of this discussion, a locomotive transmitting data to its associated control center(s) will be used as the descriptive example.

A typical locomotive communications system includes a central processing unit (CPU) which collects data to be transmitted to the control center from various sensors (and other subsystems) located onboard the locomotive and throughout the train, and arranges this data in an appropriate format for transmission. The CPU routes the formatted data to a radio transmitter and associated antenna for transmission. This usually occurs at regular, established intervals. For instance, the locomotive may be required to transmit every half-hour, on the hour and half-hour. When it is time to transmit, the on-board transmission system first tries to establish a communication's path from the train to the control center. For a radio transmission, this may involve a two-way "handshake" protocol to locate a signal tower. If a convenient signal tower is found, the locomotive's transmission system directs the data transmission through the communication's path now provided by the tower to the control center. Unfortunately, signal towers are not always conveniently located near railroad tracks, whether in parts of the United States, as well as in foreign countries. If a signal tower cannot be found, an attempt may be made to establish an alternate communication's path using a satellite or cellular system, for example. If, however, such alternate path cannot be established, a transmission may not be attempted. Rather, the system will wait until its next scheduled time and attempt the transmission again. It will be understood that the locomotive may have traveled some distance during this interval. Also, since time will have elapsed, the data which previously would have been sent will not now be current. Accordingly, it is important that when off-board communications take place, that they be reliable and fast so the information is timely transmitted to the control center and important information and data is not missed.

Wireless communications are not perfect. Besides a communications path not always being the best, other factors such as terrain and atmospheric conditions will affect the quality of the communications so that, on occasion, only a weak signal or a broken signal reaches the control center. In such circumstances, necessary information may either not be received at all; or if received, will be incomplete.

Finally, there is a cost factor associated with off-board railway communications. Railway communications not only avail themselves of signal towers which are usually not owned by the railway, but also satellites or cellular communications systems that are owned by telecommunications companies and not the railroad. Since the railroad leases these communications facilities for their data transmissions from these companies; to be cost effective, the transmission of off-board communications needs to be as efficient and complete as possible so data being downloaded is complete and the data does not have to be resent.

SUMMARY OF THE INVENTION

In accordance with the present invention, generally stated, a data transmission system for off-board communications comprises a unique configuration of radio transmitters and antennas, operating within a specified frequency range, to transmit a signal from a train which includes desired train operating information, and to receive a signal at the train containing information relevant to operation of the train. In one embodiment, a single radio transmitter is connected to at least two antennas each of which is capable of broadcasting the signal generated by a radio transmitter to a receiver located within the communication system's infrastructure and to receive a broadcast signal for the train. Operation of the antennas and radio is accomplished using an adjustable weighting function (magnitude and phase) so to provide an optimum beam combination for maximum transmission benefit (send and receive). In its simplest sense, one antenna is turned "off" while the other antenna is turned "on", thus allowing the antenna function to be optimally configured for the given transmission task. This "on-off" switching between antennas enables the transmission system to select the optimum antenna for transmission. In this system configuration, the antennas are mounted on opposite sides of a locomotive, or at other strategic locations on the locomotive.

In another embodiment, the data transmission system includes at least a first and a second radio with each radio operating within a specified frequency range and with each radio generating an off-board transmission signal for broadcast to the control station. A separate antenna is provided for each radio, the antennas facilitating the broadcast of off-board signal transmissions from one of the radios to a receiver at the control station, and receipt of a signal from the control station. In other embodiments of the invention, more than one antenna may be provided for each radio. A CPU which collects, formats, and sends data to each radio transmitter may also be provided. A further aspect of the invention includes a signal divider for splitting a data signal from the CPU and providing the resulting identical data sets to each radio or antenna. Preferably, the signal divider comprises a multiplexer. A signal recombining unit is also provided for combining the transmission signal broadcast through the first antenna with that broadcast through the second antenna. This unit can either be located on a transmission-receiving radio tower, or at the central control center. In its preferred embodiment, the data transmission system includes a performance/availability checker.

In a further embodiment of the invention, a transmission signal broadcast from one radio transmitter through one of the antennas is of a different frequency, and has a different modulation and/or communication protocol from the transmission signal broadcast by other antennas within the system.

The present invention addresses various sets of problems discussed above with respect to off-board railway communications. Though the present invention is primarily focused on off-board communications in transmitting data to a yard, depot, or central control center, the present invention also has applicability with other wireless communications related to the locomotive or train operations. These include Global Positioning System (GPS) antennas, yard radios and their associated antennas, VHF signals, cellular radio systems, and UHF signals, including distributed power radio applications and ATCS/MCP (Advanced Train Control System/Multimode Communications Processor).

Other objects and features of the invention will be in part apparent and in part pointed out hereinafter.

DESCRIPTION OF THE DRAWINGS

In the drawings.

Corresponding reference characters indicate corresponding parts throughout the several views of the drawings.

DETAILED DESCRIPTION OF THE INVENTION

Figure 1:
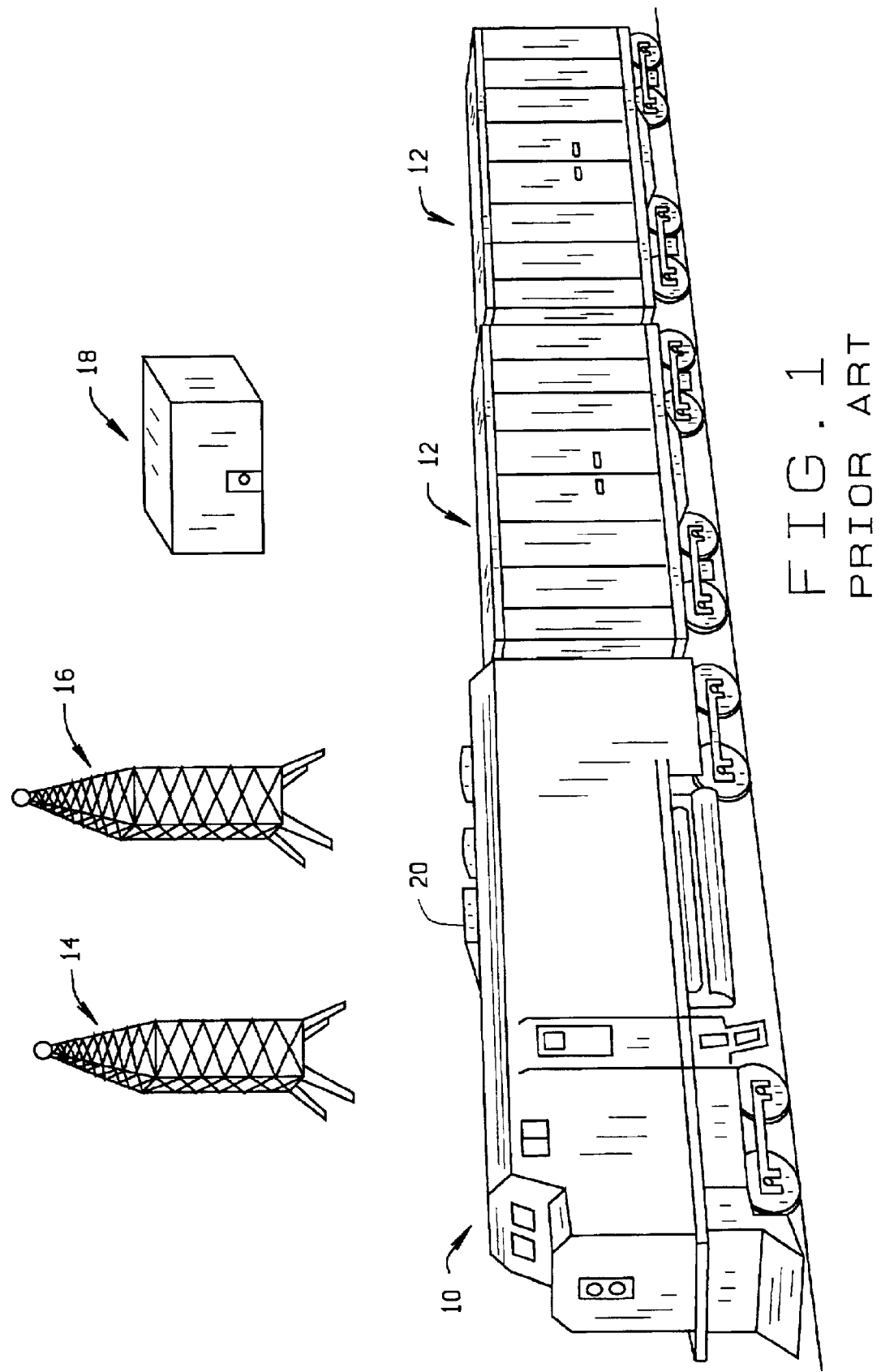
FIG. 1 is a representational view of an off-board communications system for transmitting information from a locomotive and train in service, a signal tower for transmission of the communication, and a receiving station.

Referring to FIG. 1, a railroad train is shown to include a locomotive 10 and railcars 12. Off-board communications between the train and a control station of the railroad utilize one or more signal towers 14 and 16 by which pertinent information is sent to a receiving station 18. The radio transmissions are sent from the train via an antenna 20 located atop the locomotive (or other rail based asset). There are many types of signal towers, transmission towers, and radio signal receivers presently in use, and towers 14, 16 are for illustrative purposes only. Those skilled in the art will understand that the communication's infrastructure can also be a satellite based communication system, or a cellular based system. Locomotive 10 employs multiple antennas 20 with each antenna sending or receiving information within a distinct radio frequency band for a different application. For example, locomotive 10 employs an L-Band antenna for a Global Positioning System (GPS), the GPS operating at a frequency of about 1.5 GHz. Other antennas 20 installed on the locomotive operate in the UHF and VHF frequency ranges and additional frequency bands are expected to be approved for use in the near future. For off-board communications between the train and receiving station 18, a data transmission signal is broadcast from antenna 20 to radio tower 14, retransmitted from tower 14 to tower 16, and from tower 16 to receiving station 18. Those skilled in the art will appreciate that there may be other intermediate transmissions, using additional signal towers, between tower 16 and station 18, and that this system is employed for the transmission of information both to and from the locomotive.

Figure 2:
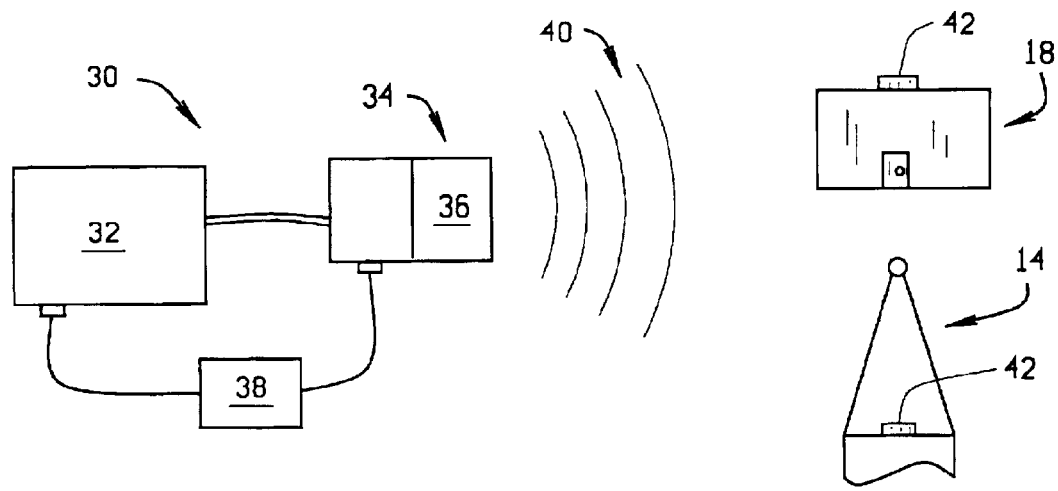
FIG. 2 is a schematic of a prior art data transmission system.

As shown in FIG. 2, a prior art data transmission system 30 includes a central processing unit (CPU) 32, a radio transceiver or radio 34, an antenna 36, and a power supply 38. The CPU 32 can be a microprocessor-type unit, or other device or system that gathers pertinent data about the locomotive and train for transmission to the control station. All of these components are located within locomotive 10. Also, CPU 32, radio transmitter 34 and antenna 36 may be separate units, or combined into a single unit. Antenna 36 broadcasts a signal 40 which is received by a receiver 42 located on radio tower 14 for re-transmission to tower 16 and ultimately to receiving station 18 as described above. Those skilled in the art will appreciate that in some circumstances the data transmission may go directly from antenna 20 to a receiver 42 located at receiving station 18.

Figure 3:
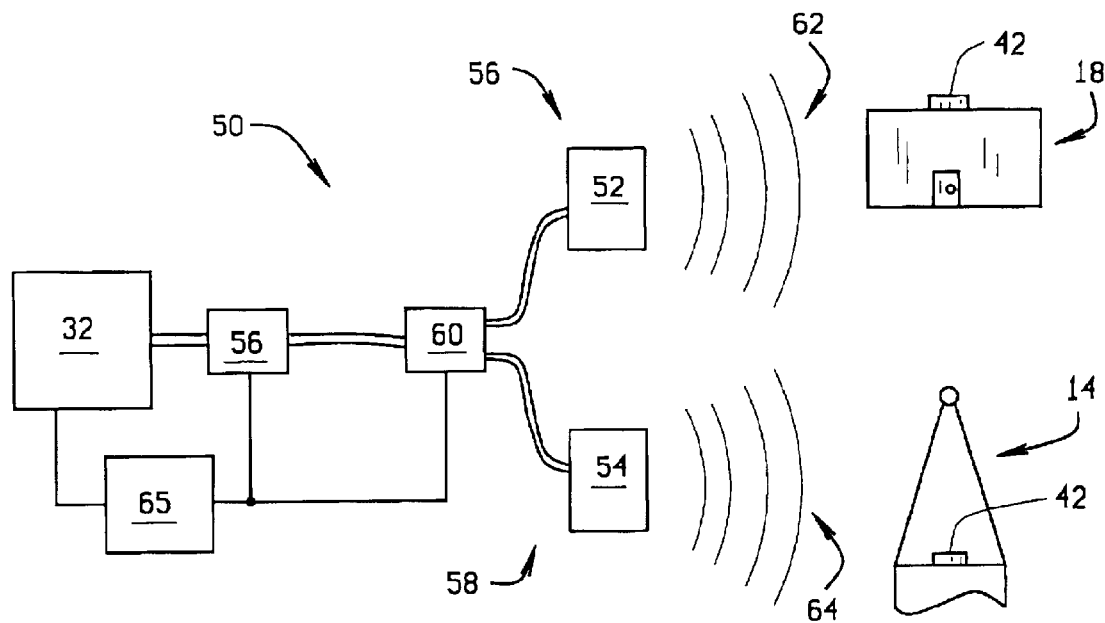
FIG. 3 is a schematic of one embodiment of a data transmission system of the present invention.

FIG. 3 illustrates a first embodiment of the present invention in which a data transmission system 50 is used for terminal diversity for off-board railway communications. As used herein, "terminal" is a common term for an antenna and/or transmitter. In the context of the present invention, terminal diversity for off-board railway communications means parallel (but not necessarily simultaneous) data transmission paths using more than one antenna to transmit a set of data between the locomotive and the receiving station.

Data transmission system 50 first includes a CPU 32 for gathering information about the train and formatting this information into an appropriate data signal for broadcast to the control station. A first antenna 52 and a second antenna 54 are included with a radio transceiver 56, both antennas and the radio being installed on locomotive 10. It will be understood that the antennas are installed at different locations; for example, one antenna may be located on one side of the train, and the other antenna on the opposite side. As such, the radiation patterns with respect to a signal tower or receiving station will be different.

A data signal output from CPU 32 is supplied to radio 56 and the resulting output signal from the radio is then divided into two separate signals by a signal divider 60. Divider 60 may comprise a multiplexer, a signal splitter, or other signal splitting means. Or, signal divider 60 may be incorporated within CPU 32 and may be implemented using software. Divider 60 supplies the respective signals to each of the antennas 52 and 54 based on a weighting function input supplied to the signal divider by the CPU. This function is an adjustable weighting function which is designed to provide an optimum signal (with respect to both magnitude and phase) for the transmission so to maximize the prospects of a complete transmission being received at the control station. In one use, the weighting function controls the transmissions from each antenna so that rather than both antennas simultaneously transmitting their input from signal divider 60, one antenna is effectively turned "off" while the other antenna is broadcasting, and vice versa. This "on-off" switching between antennas enables system 50 to select the optimum antenna for transmission with the antennas transmitting data based on the weighting function as applied at the antenna interface. Radio transceiver 56 continuously receives a reply signal from receiving station 18 which includes an indication of the quality of the signal received at the station. The reply signal may, for example, include the bit error rate performance measure of the received signal at any one time. Radio 56 supplies this information to a performance/availability checker 65 which monitors the quality of the received signals at the transmission end of the system. Checker 65, which can be implemented in hardware or software, in turn supplies an output signal to CPU 32 of its evaluation of the received transmission and the CPU uses this information as part of its weighting. So, for example, if the bit error rate rises above a predetermined limit, this information, when supplied by checker 65 to the CPU, may cause the CPU to have transmissions switched from one antenna to the other.

Data transmission system 50 transmits data signals 62 and 64 from either antenna 52 or 54 to a receiver 42 located either at first radio tower 14 or at receiving station 18. By broadcasting from the best antenna given the location of the locomotive and related factors, a data signal having optimum signal strength should reach receiver 42. In some circumstances, it may make sense to transmit from both antennas simultaneously rather than switching the antennas "on or off" as described above. In these situations, a beam-forming antenna can be employed to "point" an optimum beam (this includes polarization) toward receiver station 18.

Figure 4:
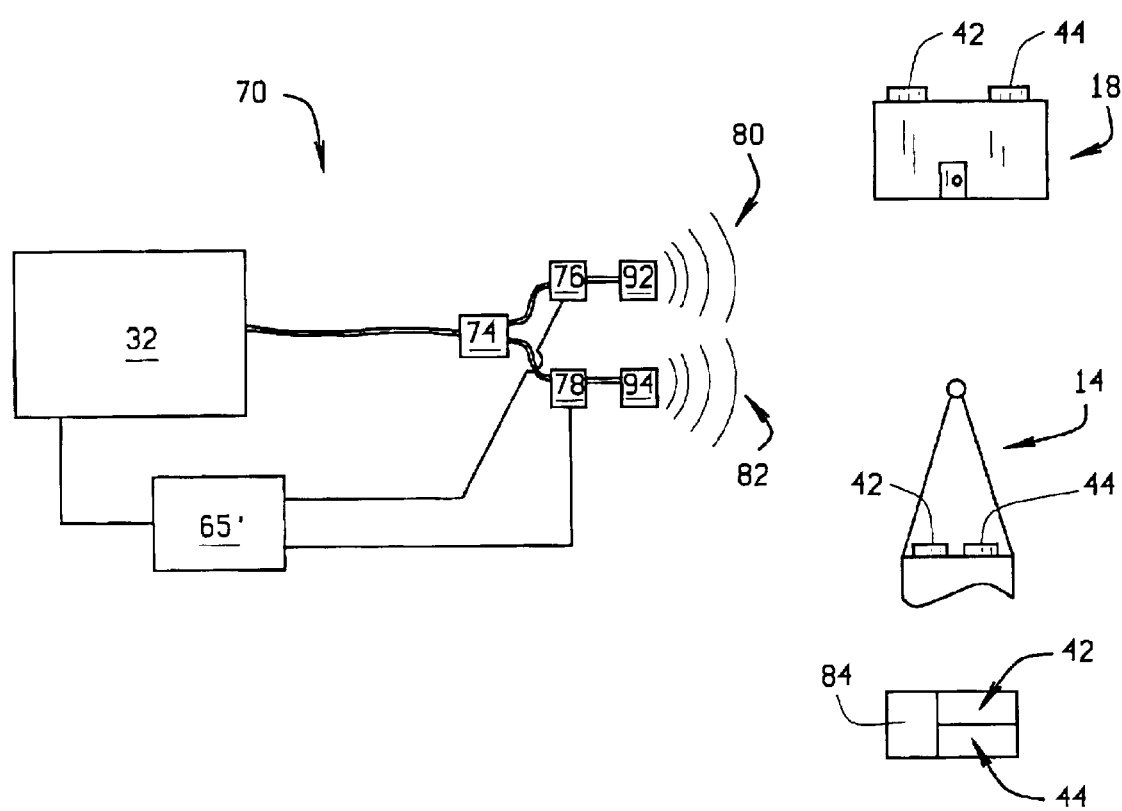
FIG. 4 is a schematic of a second embodiment of the data transmission system.

FIG. 4 depicts a data transmission system 70 comprising a second embodiment of the invention for terminal diversity for off-board railway communications. System 70 operates on the same basis as the data transmission system 50 shown in FIG. 3. Accordingly, system 70 includes CPU 32. Unlike system 50, however, data transmission system 70 utilizes a signal divider 74 connected in front of at least two radio transceivers 76, 78. As with signal divider 60, signal divider 74 may a multiplexer, a signal splitter or similar device, or may be implemented by software. Regardless, the signal divider produces two independent data signals each of which is directed to a separate one of the radios 76, 78. These signals are then broadcast over parallel transmission paths to separate receivers 42, 44 which may be located on radio tower 14 or at receiving station 18.

In the embodiment of by FIG. 4, a data signal recombining unit 84 is employed. As with signal divider 74, recombining unit 84 is implemented by a multiplexer, a signal splitter or similar device, or may be effected by appropriate software. Regardless of how implemented, unit 84 combines the signals into a single signal data set. As shown in FIG. 4, data signal recombining unit 84 may be incorporated in a receiver 42, 44; although they may be units separate from the receivers. It is an advantage of data transmission system 70 that the data signals may be broadcast at different frequencies, and using different modulations (spread spectrum, for example) and/or signal transmission protocols (for example, overlaying one signal over another, or employing an orthogonal signal pattern). This is accomplished by appropriately programming the respective radio transceivers to operate at different frequencies, or to employ different modulation schemes, or different transmission protocols. Data signal divider 74 and signal recombining unit 84 are employed to first effect two separate, parallel data transmission paths at the transmission end of the system (locomotive 12) and then to recombine the two signals at the receiving end of the system and insure that the recombined data received at station 18 is complete.

Those skilled in the art will understand that the transmission path including signal towers 14 and 16 are usually owned by a telecommunications company which charges the railroad a usage fee. By sending transmissions on parallel paths, in accordance with the present invention, use of the transmission system and its attendant cost to the railroad is minimized. Although not shown, it will further be understood that additional transmission paths can be utilized by incorporating additional antennas, signal splitters, and recombining equipment into the system.

As in the embodiment of FIG. 3, off-board communications system 70 includes a performance/availability checker 65'. The performance/availability checker again is used to monitor signal strength and transmission integrity, and to determine if the transmission should be shifted in frequency, if a different modulation should be used, or if the transmission should be switched from one antenna to another. The checker receives inputs from each transceiver 76, 78 in response to response signals received from receiving site 18. As before, the output of the performance checker is supplied to CPU 32 so for the CPU to control or modify the signal transmission, as appropriate.

What has been described is a data transmission system 50, 70 for off-board railway communications from a locomotive, the system including at least one radio and multiple antennas transmitting parallel signals on parallel transmission paths. Data transmission systems 50, 70 incorporate a data signal divider 60, 74 or means for dividing a data signal from CPU 32. The transmission signals are received by a receiver 42 located at either a tower 14, receiving station 18, or other receiving point. The data signals are then recombined at the receiving site by a data signal recombining unit 84. Additional transceivers can be used in the system, as well as additional antennas.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A data transmission system for off-board communications to and from a railroad train comprising:
 a central processing unit to which information relating to operation of the train is received and formatted for transmission to a receiving site remote from the train;
 a radio to which a signal for transmission to the receiving site is supplied by the central processing unit, the radio operating within a specified frequency range;
 at least two antennas to each of which a transmission signal produced by the radio is sent for broadcasting by the antennas to a receiver located at the receiving site; and,
 a signal splitter by which a transmission signal produced by the radio is divided, the signal splitter supplying transmission signals to each of the antennas for transmission thereby to the receiving site on a selective basis which is a function of signal magnitude and phase weighting whereby the transmission signal is broadcast by the antennas, the central processing unit selecting which of the antennas over which the transmission signal is broadcast at any one time.

2. The data transmission system of claim 1 wherein the supply of a transmission signal by the signal splitter to the antennas is controlled by the central processing unit as a function of the signal magnitude and phase weighting.

3. The data transmission system of claim 1 further including a performance/availability checker.

4. A data transmission system for terminal diversity for off-board railway communications from a railroad train comprising:
 first and second radios each operating within a specified frequency range;
 a separate antenna connected to each radio and through which a transmission signal is separately transmitted to a receiving site or received from the site;
 at least two receivers located at the receiving site for receiving signals broadcast transmitted through the respective antennas;
 a recombining unit for combining the transmissions received by each receiver so to produce a complete signal transmission;
 a controller for controlling the selection of antennas for communication, and including a central processing unit to which information relating to operation of the train is received and formatted for transmission to the receiving site; and,
 a signal divider for splitting an output signal from the central processing unit and supplying the signal to each radio.

5. The data transmission system of claim 4 wherein the signal divider is a multiplexer.

6. The data transmission system of claim 4 wherein the transmission signal broadcast from one antenna is different from the transmission signal broadcast from the other antenna.

7. The data transmission system of claim 4 further comprising a performance/availability checker.

8. A data transmission system for terminal diversity for off-board railway communications from a railroad train comprising:
 a central processing unit to which information relating to operation of the train is received and formatted for transmission to a receiving site;
 first and second radios to which an output signal from the central processing unit is directed;
 a signal divider to which an output signal from the central processing unit is directed, the signal divider splitting the output signal and separately providing it to each of the radios;
 a first antenna to which a transmission signal from one of the radios is directed for broadcasting the transmission signal to the receiving site;
 a second antenna to which a transmission signal from the other radio is directed for broadcasting the transmission signal to the receiving site;
 first and second receivers located at the receiving site for receiving the broadcast transmission signals;
 a recombining unit for combining the transmissions received by each receiver so to produce a complete signal transmission; and,
 wherein the central processing unit selects which of the antennas over which a transmission signal is broadcast at any one time.

9. The data transmission system of claim 8 wherein the frequency at which a signal is broadcast from one of the antennas is different from the frequency at which the signal is broadcast from the second antenna.

10. The data transmission system of claim 9 wherein the signal provided from one of the radios for transmission by its associated antenna has a modulation different from that of the signal provided by the other radio for transmission by its associated antenna.

11. The data transmission system of claim 10 wherein the signal provided from one of the radios for transmission by its associated antenna has a broadcast protocol different from that of the signal provided by the other radio for transmission by its associated antenna.

12. The data transmission system of claim 8 further comprising a performance/availability checker.

13. The data transmission system of claim 8 further comprising additional antennas for broadcasting a transmission signal to a selected receiver.

14. The data transmission system of claim 13 wherein each signal being broadcast by one of the antennas is of a different frequency, modulation, and broadcast protocol than a signal broadcast from one of the other antennas.

* * * * *